United States Patent
Lee et al.

(10) Patent No.: US 10,374,881 B2
(45) Date of Patent: Aug. 6, 2019

(54) METHOD OF NETWORK SUBSCRIPTION IN A WIRELESS NETWORK

(71) Applicant: hyBee, Inc., Gyeonggi-Do (KR)

(72) Inventors: Yong Hwan Lee, Seoul (KR); Hyung Sin Kim, Seoul (KR); Jae Seok Bang, Busan (KR)

(73) Assignee: hyBee, Inc., Gyeonggi-do (KR)

( * ) Notice: Subject to any disclaimer, the term of this patent is extended or adjusted under 35 U.S.C. 154(b) by 721 days.

(21) Appl. No.: 14/762,230

(22) PCT Filed: Dec. 13, 2013

(86) PCT No.: PCT/KR2013/011571
§ 371 (c)(1),
(2) Date: Jul. 21, 2015

(87) PCT Pub. No.: WO2014/112721
PCT Pub. Date: Jul. 24, 2014

(65) Prior Publication Data
US 2015/0350022 A1    Dec. 3, 2015

(30) Foreign Application Priority Data
Jan. 21, 2013  (KR) .................. 10-2013-0006394

(51) Int. Cl.
*H04W 8/26*     (2009.01)
*H04L 12/24*    (2006.01)
(Continued)

(52) U.S. Cl.
CPC .......... *H04L 41/0816* (2013.01); *H04L 41/12* (2013.01); *H04L 45/00* (2013.01);
(Continued)

(58) Field of Classification Search
None
See application file for complete search history.

(56) References Cited

U.S. PATENT DOCUMENTS 7,844,308 B2    11/2010 Rhee et al.
7,869,384 B2 *   1/2011 Fang ................. H04L 29/12254
                                                  370/256
(Continued)

FOREIGN PATENT DOCUMENTS

KR    1020060045844 A    5/2006
KR     100644695 B1     11/2006
(Continued)

OTHER PUBLICATIONS

Yen et al. "Flexible Address Configurations for Tree-Based ZigBee/IEEE 802.15.4 Wireless Networks," 22nd Int'l Conference on Advanced Information Networking and Applications, IEEE, 2008 [retrieved on Dec. 20, 2017]. Retrieved from the Internet: <URL: http://ieeexplore.ieee.org/stamp/stamp.jsp?arnumber=4482734>.*

(Continued)

*Primary Examiner* — Sm A Rahman
*Assistant Examiner* — Dae Kim
(74) *Attorney, Agent, or Firm* — The Webb Law Firm

(57) ABSTRACT

Provided is a method of subscribing, by a terminal, to a network as a router or an end device in a wireless network (WN) having a tree structure including routers and end devices. Each router receives, from a parent router thereof, addresses which are usable independently for child routers and child end devices thereof, and classifies the addresses into a general address and a special address. A terminal wishing to subscribe to a network may subscribe to the network by using a special address of an end device, only when the terminal is unable to subscribe to the network by using a general address of the end device, thereby reducing depletion of addresses to be used for terminal subscription and facilitating network subscription of the end device.

13 Claims, 7 Drawing Sheets

(51) Int. Cl.
  *H04W 40/24* (2009.01)
  *H04L 12/701* (2013.01)
  *H04L 12/741* (2013.01)
  *H04L 29/12* (2006.01)

(52) U.S. Cl.
  CPC .......... *H04L 45/74* (2013.01); *H04L 61/2038* (2013.01); *H04L 61/2046* (2013.01); *H04L 61/6081* (2013.01); *H04W 8/26* (2013.01); *H04W 40/24* (2013.01); *H04W 40/246* (2013.01)

(56) References Cited

U.S. PATENT DOCUMENTS

| | | | |
|---|---|---|---|
| 7,995,502 B2* | 8/2011 | Shim | H04L 29/12254 370/255 |
| 7,996,561 B2 | 8/2011 | Lee et al. | |
| 8,134,964 B2* | 3/2012 | Pan | H04L 29/12254 370/329 |
| 8,295,254 B2 | 10/2012 | Kim et al. | |
| 2006/0029002 A1* | 2/2006 | Park | H04L 29/12009 370/254 |
| 2007/0195808 A1 | 8/2007 | Ehrlich et al. | |
| 2008/0089277 A1* | 4/2008 | Alexander | H04L 12/2816 370/328 |
| 2008/0291855 A1* | 11/2008 | Bata | H04W 84/18 370/311 |
| 2009/0006596 A1* | 1/2009 | Dinakaran | H04L 12/66 709/223 |
| 2010/0177749 A1* | 7/2010 | Essinger | G06F 1/1626 370/338 |
| 2011/0066297 A1* | 3/2011 | Saberi | F16K 31/046 700/287 |
| 2011/0138026 A1* | 6/2011 | Jeong | H04L 29/12254 709/222 |
| 2012/0254247 A1* | 10/2012 | Sakamoto | G06Q 10/06 707/784 |
| 2012/0271924 A1* | 10/2012 | Spitaels | H04L 61/2092 709/220 |
| 2013/0003596 A1* | 1/2013 | Lelkens | H04L 29/12283 370/252 |
| 2015/0036545 A1 | 2/2015 | Lee et al. | |

FOREIGN PATENT DOCUMENTS

| | | |
|---|---|---|
| KR | 100684166 B1 | 2/2007 |
| KR | 100730758 B1 | 6/2007 |
| KR | 1020080025095 A | 3/2008 |
| KR | 1020090099217 A | 9/2009 |
| KR | 1020120096276 A | 8/2012 |

OTHER PUBLICATIONS

Ech-Chaitami et al. "Interoperability of LoWPANs Based on the IEEE802.15.4 Standard through IPV6", International Journal of Computer Science Issues, vol. 8, Issue 2, Mar. 2011 [retrieved on Dec. 20, 2017]. Retrieved from the Internet: <URL: https://ijcsi.org/papers/IJCSI-8-2-315-323.pdf>.*

ZigBee Alliance, "ZigBee Specification," www.zigbee.org, Jan. 2008.

Z. Shelby, et al., "Neighbor Discovery Optimization for Low Power and Lossy Networks (6LoWPAN)", IETF Internet draft, May 2011.

* cited by examiner

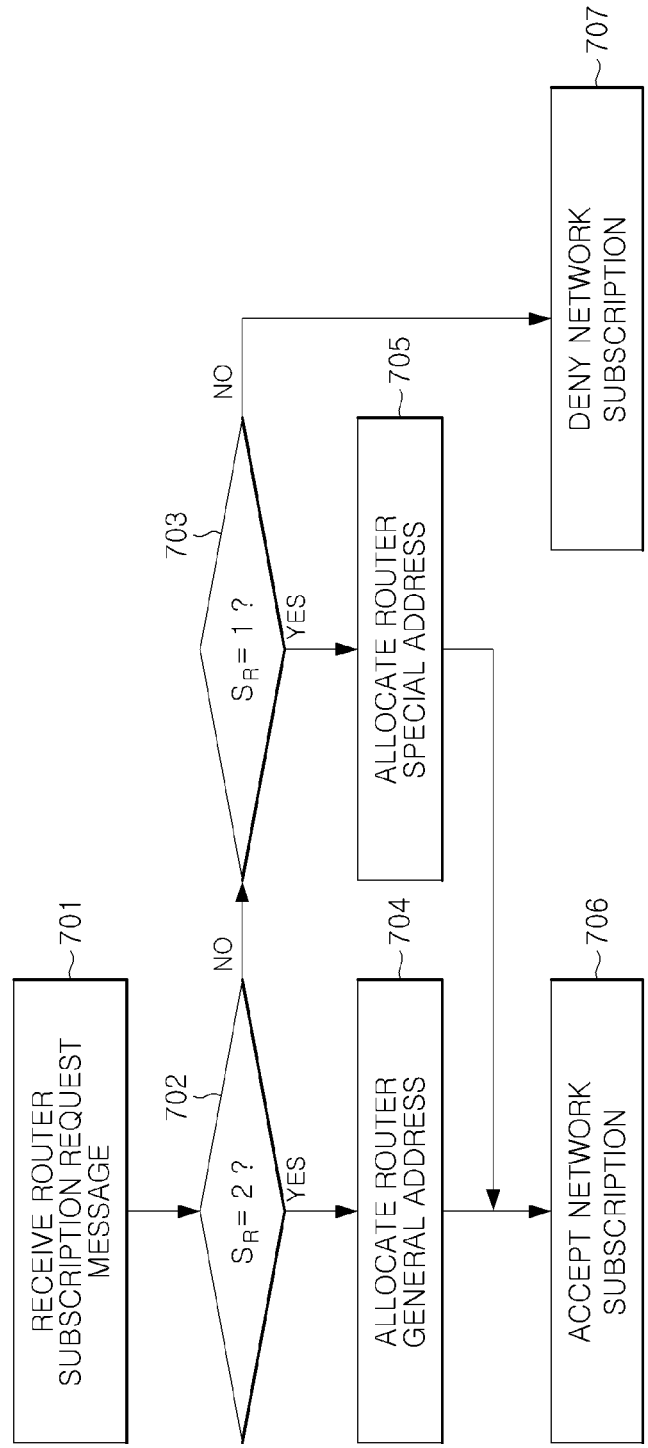

METHOD OF NETWORK SUBSCRIPTION IN A WIRELESS NETWORK

CROSS-REFERENCE TO RELATED APPLICATIONS

This application is the United States national phase of International Application No. PCT/KR2013/011571 filed Dec. 13, 2013, and claims priority to Korean Patent Application No. 10-2013-0006394 filed Jan. 21, 2013, the disclosures of which are hereby incorporated in their entirety by reference.

TECHNICAL FIELD

The present invention relates to a distributed network subscription (association) method for improving network scalability of a wireless network (WN).

BACKGROUND ART

Since network devices in a wireless network (WN) can be recognized by addresses uniquely assigned during network subscription process, it is desired to uniquely allocate addresses to the network devices with low message overhead and low power in order to build a large-scale WN comprising battery-powered network devices.

ZigBee, a representative WN device, provides a distributed address allocation mechanism (DAAM) for a cluster tree structure described below in order to reduce signaling overhead during a network subscription process [1]. All devices share a number of maximum child devices, Cm, a number of maximum child routers, Rm, and a maximum network depth Lm, which are pre-determined before the construction of a network. Each router has Cm independent addresses available for network subscription in a balanced tree structure, wherein Rm independent addresses may be available for allocation to child routers and the remaining, i.e., (Cm-Rm), independent addresses may be available for allocation to child end devices. Each device first selects a parent device among parent candidates (i.e., routers within a communication range) and requests the parent device for subscription as a child router. If subscription is denied by all parent candidates, each device then requests for subscription as a child end device. A router requested as a parent device can accept a device if it has an address available for allocation to a device (i.e., a router or an end device) requesting for subscription. Then the router allocates an address to the device, and establishes a parent-child relationship with the device.

Also, ZigBee provides a stochastic address allocation technique [1]. The stochastic address allocation technique does not provide each router independent addresses available for subscription, but it allows a router being requested as a parent device to arbitrarily select an address in entire address space and to allocate it to a device requesting for subscription. Then, the router broadcasts a message including information on the allocated address to all devices in a network to verify whether the allocated address is previously allocated to another device or not, and when it is determined that the allocated address is previously allocated to another device, the router repeats the address allocation process. 6LoWPAN, a new Internet-based WN system, suggests a technique for detecting validity of address allocation, wherein each device arbitrarily selects an address in entire address space by itself and then directly requests a coordinator, which has address information of all devices, for confirmation whether the selected address is previously used by another device [2]. This technique allocates an address to each device in a centralized manner.

Non-patent documents that are prior arts described above are as follows.

(Non-Patent Document 1)[1] ZigBee Alliance, "ZigBee specification," www.zigbee.org, January 2008.
(Non-Patent Document 2)[2] Z. Shelby, et al, "Neighbor discovery optimization for low power and lossy networks (6LoWPAN), IETF Internet draft, May 2011.

DETAILED DESCRIPTION OF THE INVENTION

Technical Problem

The distributed network subscription process of ZigBee may reduce the time for network subscription and the signaling overhead for exchange of control command messages since a router being requested as a parent device determines whether network subscription is allowed and allocates an address without message exchange with devices other than a device requesting for subscription. However, when a device requesting for subscription selects a parent device, it may not be aware of the amount of addresses available for each router, which may cause subscription request to be concentrated on a certain router. In this case, the certain router may exhaust the address size available by itself, which may deteriorate network subscription performance. Moreover, though a device may subscribe a network with a low network depth if it joins the network as an end device, it requests subscription as a router until its subscription request is denied by all peripheral parent candidates, which may result in network subscription with a network depth much higher than being efficiently subscribed at the same distance from a coordinator. Accordingly, the network is hard to be extended to a large area even when the network depth increases.

The probabilistic address allocation technique of ZigBee may guarantee network subscription of all devices using an entire address space, but as a scale of wireless network (WN) increases, a probability of duplicate address allocation increases and thus overhead associated with broadcasting messages for address allocation seriously increases, and a time for unique allocation of addresses may also increase. Besides, a parent device allows subscription of child devices as long as there is an available address space, which may cause all devices to be subscribed as a router, which may consume power much higher than an end device.

A technique of 6LoWPAN for detection of duplicated address allocation may guarantee network subscription of all devices using an entire address space without broadcasting messages related to address allocation since addresses are allocated in a centralized manner, but it may still suffer from overhead for message exchange to a coordinator in a multi-hop WN and thus a large time delay for subscription.

The present invention provides a method of subscribing to a network in a distributed manner in a WN, in order to alleviate such problems of existing techniques.

Technical Solution

According to the present invention, available address space (i.e., address space for child routers and address space for child end devices of a router) is independently allocated to each router, and the address space for the child routers and the child end devices are respectively classified into general address space and special address space. A network device requesting for subscription to a network first tries subscription as an end device using a general address space for child end devices. When the subscription is denied by all parent candidates or the network device subscribed to the network as an end device requests for re-subscription to the network, the network device requests for subscription as an end device using a special address space for child end devices. A router allows network subscription only when an address is allocable by allocating an end device requesting for subscription an address in the general address space for child end devices and an end device a address in the special address space for child end devices without message exchange with other devices, and, thereby minimizing the use of the special address space for child end devices. Also, according to the present invention, when network devices are all subscribed to a network as an end device or the general addresses space for child end devices is fully used up, a router converts its child end devices as its child routers in an ascending order of received signal strength (RSS) (i.e., in a descending order of distance from the router) as a child router using a general address for child routers, thereby enabling to efficiently extend network size according to an increase of network depth and minimizing the use of special addresses for child routers by using general address or special address space for child routers in response to a router re-subscription request. Compared to conventional techniques, a network subscription success rate may be improved by the two-step address allocation and the child router selection process, while requiring for low signaling overhead for message exchange.

Advantageous Effects

The present invention relates to a distributed network subscription method for a wireless network (WN), which includes processes of classifying addresses and subscribing and re-subscribing to a network considering the classified addresses, which reduces address depletion, and processes of selecting and converting a parent router and a child router, which facilitates network extensibility. Accordingly, a network subscription performance of a large-scale WN may be improved compared to an existing technique, with a low message exchange load.

DESCRIPTION OF THE DRAWINGS

FIG. 7 is a diagram illustrating a child router subscription acceptance process of a parent device, according to an embodiment of the present invention.

BEST MODE

Hereinafter, exemplary embodiments of the present invention will be described in detail with reference to the accompanying drawings. In the description of the present invention, certain detailed explanations of related art are omitted when it is deemed that they may unnecessarily obscure the essence of the invention. Also, the terminologies used are defined considering functions herein, and may be called differently based on intentions or customs of a user or an operator. Accordingly, the terminologies may be defined based on the contents of the specification.

Figure 1:
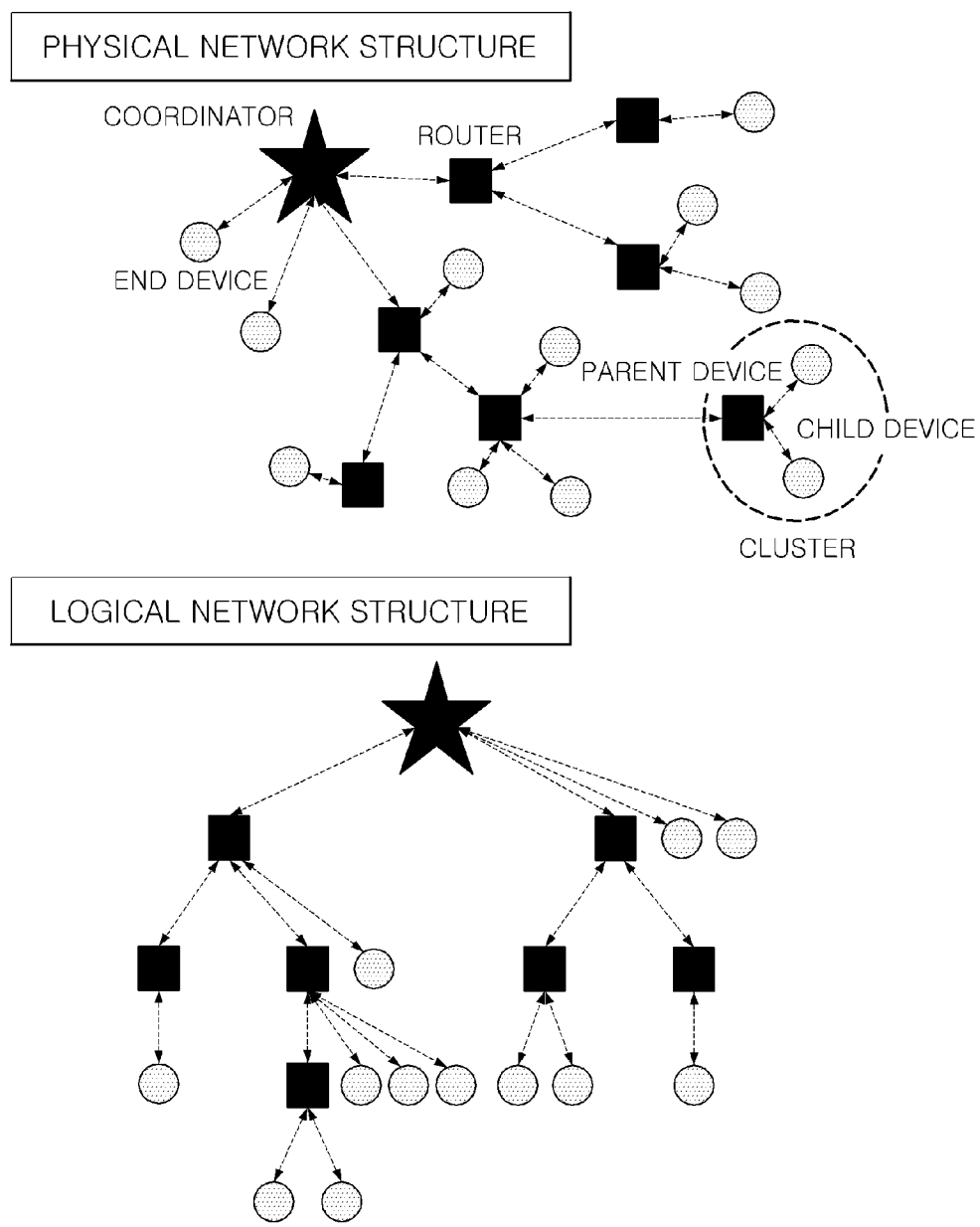
FIG. 1 is a diagram of a wireless network (WN) based on a cluster tree structure, according to an embodiment of the present invention.

The present invention considers a cluster tree-based wireless network (WN) wherein devices are connected in a parent/child relationship, a parent device includes a plurality of child devices to form a cluster, and a plurality of clusters are connected in a parent/child relationship as shown in FIG. 1. A network depth of a child device is higher than that of a parent device by 1. Here, it is assumed that a router may operate as a parent device or a child device, and an end device may operate only as a child device. The WN can be extended by making each router accept subscription of network devices as its child routers, and a child router operates as a parent device to accept subscription of other network devices. A network device requesting for subscription to a network may acquire information on routers for subscription by receiving a beacon message transmitted from routers nearby. It is assumed that each router uses an address space independent of each other, that may be allocated to its child devices thereof, wherein the address space is divided into $N_R$ addresses for child routers and $N_{ED}$ addresses for child end devices (for example, a distributed address allocation mechanism of ZigBee).

MODE OF THE INVENTION

Figure 2:
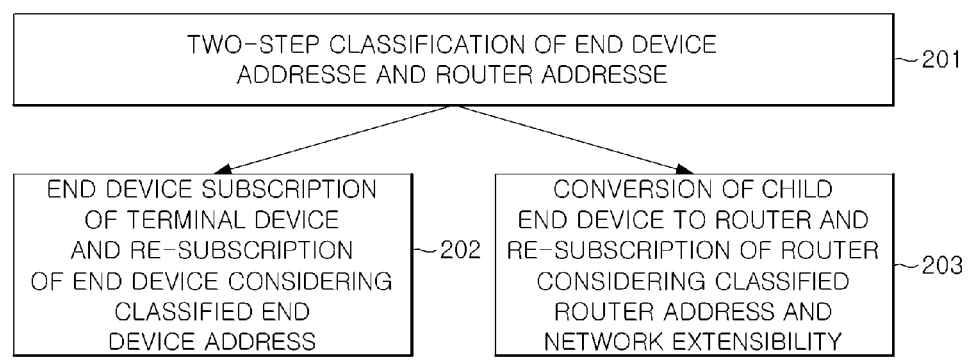
FIG. 2 is a diagram illustrating a network subscription procedure of a WN, according to an embodiment of the present invention.

An overall configuration of the present invention will now be described. According to the present invention, first, each router divide each of address space for child end devices and child routers into a general address space and a special address space, in operation 201 of FIG. 2. According to the present invention, processes for network subscription of a network device as an end device and network re-subscription of end devices are performed in two steps using the two address spaces for child end devices in operation 202 of FIG. 2, and processes for converting some of end devices into routers and network re-subscription of routers are performed considering the two router address spaces for child routers and network scalability in operation 203 of FIG. 2.

Operation principles of operation 201 of the present invention will now be described. For given address threshold values $\delta_{ED}$ and $\delta_R$, each router divides its $N_{ED}$ addresses for child end devices into ($N_{ED}-\delta_{ED}$) general addresses and $\delta_{ED}$ special addresses for child end devices, and its $N_R$ addresses for child routers into ($N_R-\delta_R$) router general addresses and $\delta_R$ router special addresses for child routers. The router sets a flag $S_{ED}$ representing status of address space for child end devices to 0 when general addresses and special addresses for child end devices are both fully used up, to 1 when general addresses for child end devices are fully used up but special addresses for child end devices are available, and to 2 when general addresses and special addresses for child end devices are both available. The router sets a flag $S_R$ representing status of address space for child routers to 0 when general addresses and special addresses for child routers are both fully used up, to 1 when general addresses for child routers are fully used up but special addresses for child routers are available, and to 2 when general addresses and special addresses for child routers are both available. The router transmits a beacon message including the flags representing the status of address space for child end devices and child routers.

Figure 3:
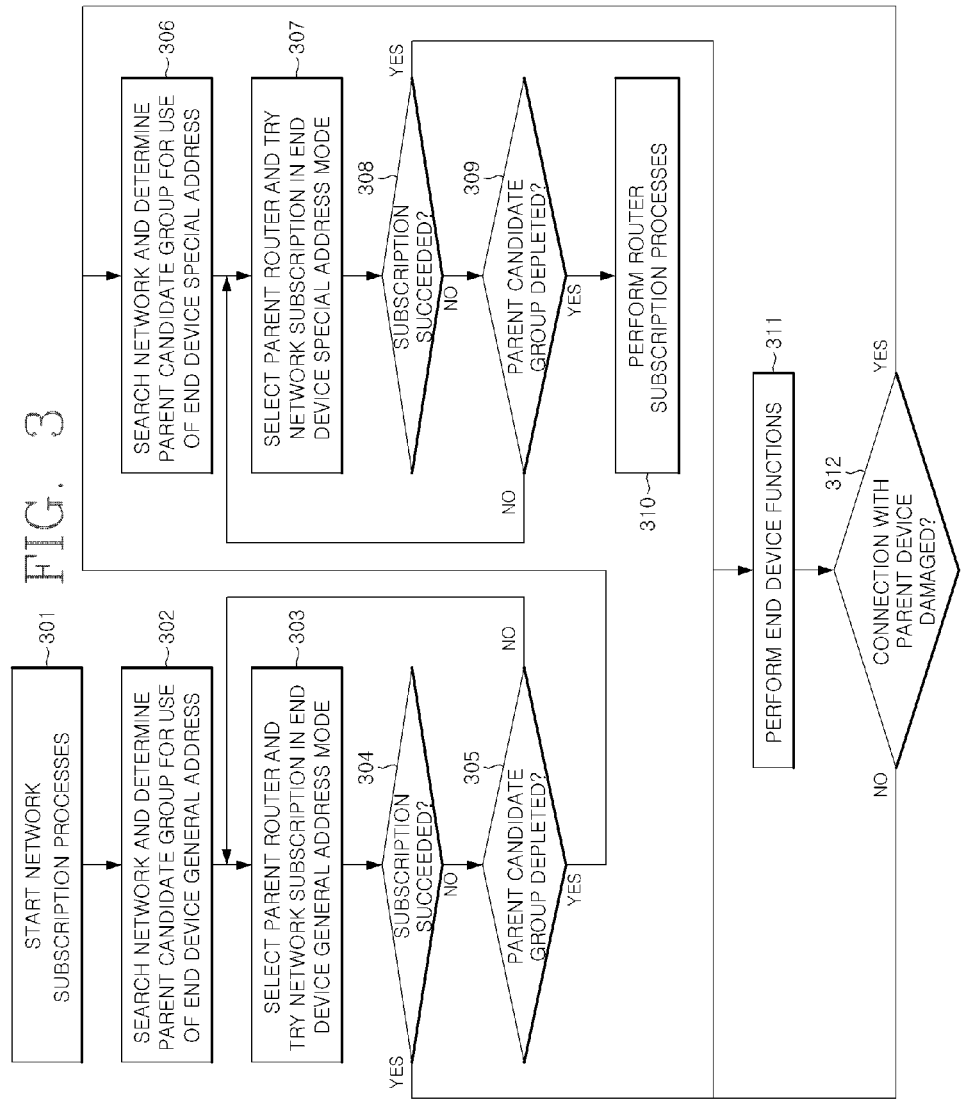
FIG. 3 is a diagram illustrating an end device subscription process of a subscription requesting device, according to an embodiment of the present invention.
Figure 4:
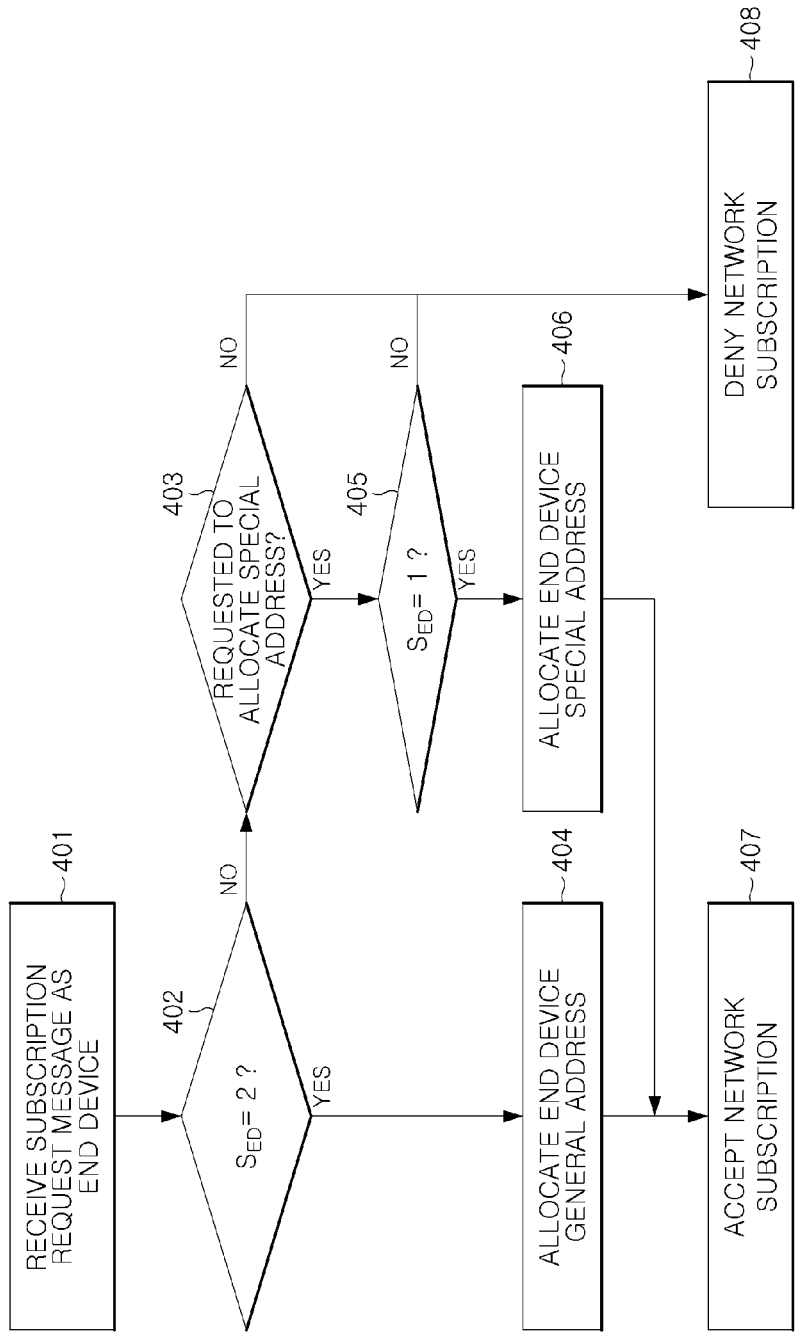
FIG. 4 is a diagram illustrating a child end device subscription acceptance process of a parent device, according to an embodiment of the present invention.

Operation principles of operation 202 according to an embodiment of the present invention are shown in FIGS. 3 and 4. Operation processes of a network device trying to subscribe a network as an end device considering the two address spaces for child end devices will now be described with reference to FIG. 3. When network subscription processes start in operation 301 of FIG. 3, a device subscribing to a network first acquires information on routers for subscription by receiving a beacon message transmitted from routers nearby and forms a parent candidate group comprising routers with $S_{ED}=2$ among the routers nearby (i.e., routers of which an general address space and special address space for child end devices are both available) in operation 302 of FIG. 3. Then, in operation 303 of FIG. 3, the device subscribing to a network requests a parent device in the parent candidate group for subscription as an end device using the general address for child end devices, and when it is determined that the subscription is successful in operation 304 of FIG. 3 (i.e., when a subscription acceptance message is received), the device performs end device functions in operation 311 of FIG. 3. However, when it is determined that the subscription failed in operation 304 (i.e., when a subscription denial message is received), the device removes the parent device from the parent candidate group, and when it is determined that routers in the parent candidate group are still available in operation 305 of FIG. 3, operation 303 is performed again using the general address for child end devices until no router in the parent candidate group is available. When it is determined that routers the parent candidate group are not available in operation 305, the device updates the information on routers for subscription by again receiving a beacon message transmitted from routers nearby and forms a parent candidate group comprising routers with $S_{ED} \geq 1$ (i.e., routers of which special address space for child end devices is available) in operation 306 of FIG. 3, selects a parent device in the parent candidate group in a descending order of the remaining address space for child end devices, and requests it for network subscription using the special address for child end devices. Then, when it is determined that the subscription is successful in operation 308 of FIG. 3, the device performs end device functions in operation 311, and when it is determined that the subscription failed, the device removes the parent device from the parent candidate group, and performed again using the general address for child end devices until no router in the parent candidate group is available. When it is determined that routers in the parent candidate group are available in operation 309 of FIG. 3, the device repeats the subscription operation 307 of FIG. 3 until no router in the parent candidate group is available. When it is determined that no router in the parent candidate group is available in operation 309, the device determines that it fails to subscribes to a network as an end device, and re-tries network subscription by performing router subscription processes in operation 310 of FIG. 3. The device performing end device operations in operation 311 after network subscription may perform operation 307 using the special address for child end devices for network re-subscription when network connection to a parent device is disconnected in operation 312.

Operation of a parent device for network subscription of a network device as an end device using the two address spaces for child end devices will be described with reference to FIG. 4. When the parent device receives a subscription request message from a network device in operation 401 of FIG. 4 and it is determined that $S_{ED}=2$ in operation 402 of FIG. 4 (i.e., when an address in a general address space of $(N_{ED}-\delta_{ED})$ addresses for child end devices is available), the parent device allocates the subscription requesting device an address in the general address space for child end devices in operation 404, and accepts network subscription in operation 407 of FIG. 4 (i.e., transmits a subscription acceptance message). However, when it is determined that $S_{ED} \leq 1$ in operation 402 (i.e., when no available address in the general address space for child end devices exists), the parent device performs operation 405 of FIG. 4 when the network device requests for subscription using the special address for child end devices in operation 403 of FIG. 4, and rejects the network subscription in operation 408 of FIG. 4 (i.e., transmits a subscription denial message) unless the network device requests subscription using the special address for child end devices. When it is determined that $S_{ED}=1$ in operation 405 (i.e., when it is determined that an address among $\delta_{ED}$ special addresses for child end devices is available), the parent device allocates an address in the special address space for child end devices to the network device in operation 406 of FIG. 4 and accepts the network subscription in operation 407 (i.e., transmits a subscription acceptance message), and when it is determined that $S_{ED}=0$ in operation 405 (i.e., when it is determined that all $N_{ED}$ addresses for child end devices are used up), the parent device rejects the network subscription in operation 408 (i.e., transmits a subscription denial message). The present invention allows a router to accept subscription request of a network device by itself using its own address space for its child devices in a distributed manner, thus requiring low signaling overhead for message exchange for network subscription. Also, according to the present invention, the address space is divided into two spaces. A network device can request network subscription using the special address for child end devices only after it fails to subscribe to a network using the general address for child end devices, a parent device can allocate an address in the special address for child routers to a device requesting subscription as a child router only when it completely uses up the general address space for child routers, which saves $\delta_{ED}$ address space for child routers and thus minimizes depletion possibility of address space for child routers.

Figure 5:
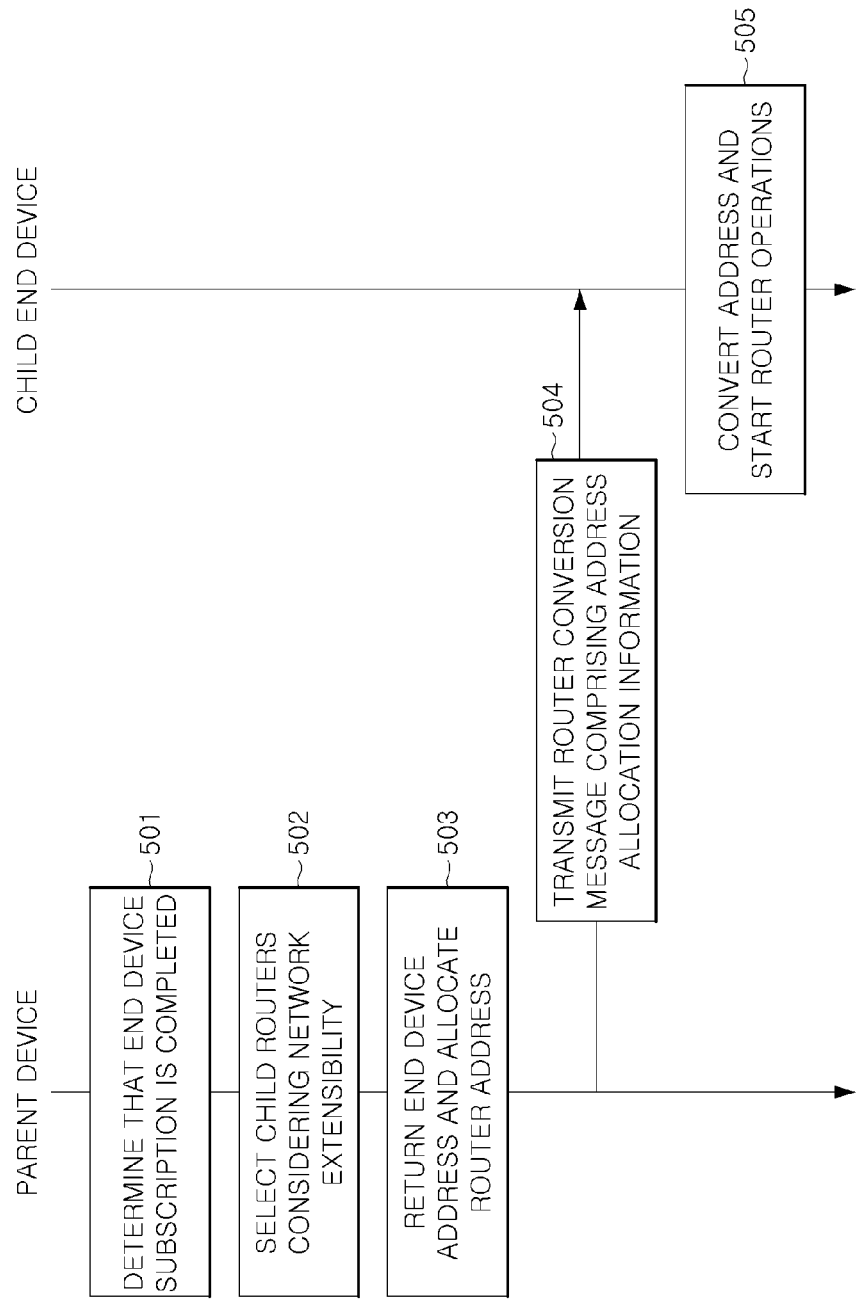
FIG. 5 is a diagram illustrating a router conversion process of an end device, according to an embodiment of the present invention.
Figure 6:
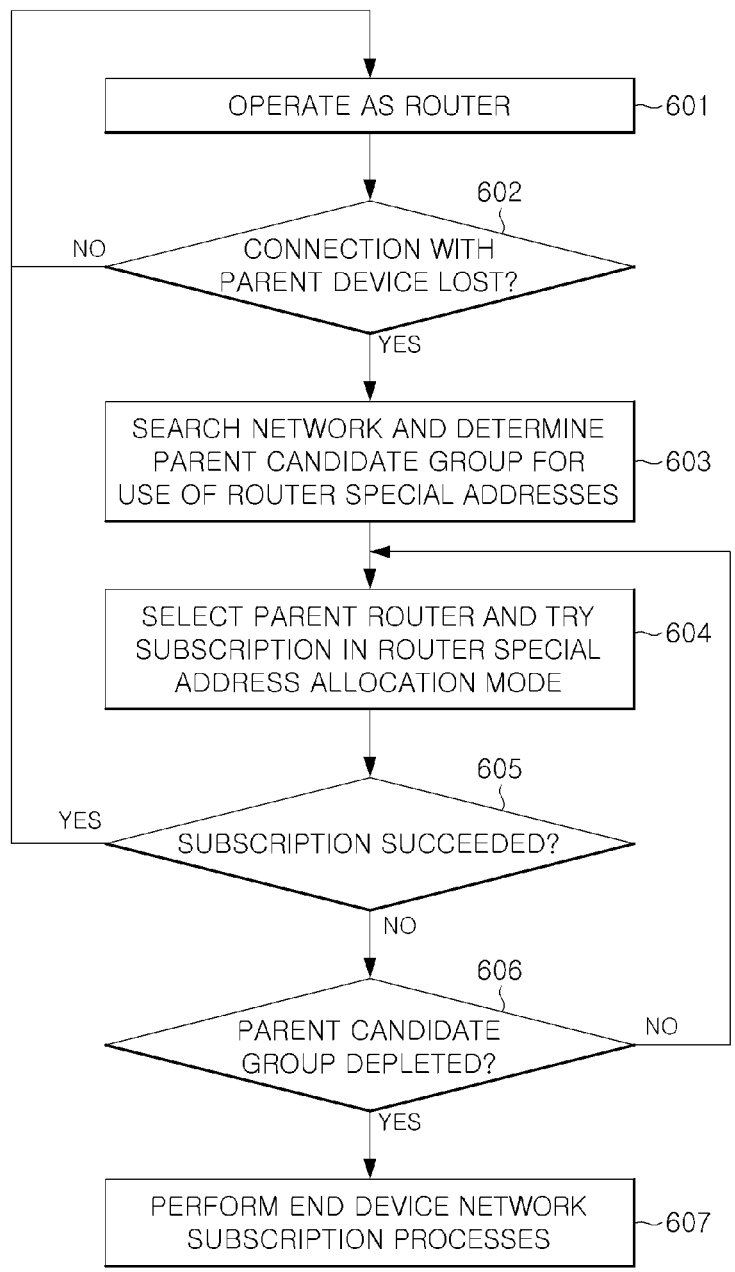
FIG. 6 is a diagram illustrating a router subscription process of a subscription requesting device, according to an embodiment of the present invention.

Operation principle of operation 203 according to an embodiment of the present invention is shown in FIGS. 5, 6, and 7. Router conversion processes of an end device considering router addresses divided into the two spaces and network scalability will now be described with reference to FIG. 5. First, when a parent device completely uses up $(N_{ED}-\delta_{ED})$ general addresses for end devices or it does not receive a network subscription request message for at least a time duration of $\tau$ after the reception of the last network subscription request message, it determines that end device subscription is completed in operation 501 of FIG. 5 and selects maximum $(N_R-\delta_R)$ child end devices in an ascending order of received signal strength (RSS) (i.e., in a descending order of distance from the parent device) in order to efficiently provide network scalability while minimizing the network depth in operation 502 of FIG. 5. After the parent device retrieves the address end device address that was allocated to the selected child end device and allocates a general address for child routers to the selected child end device in operation 503 of FIG. 5, it transmits a router conversion message including information on the newly allocated address to the selected child end device in operation 504 of FIG. 5, and the selected child end device updates its address as the address included in the router conversion message and performs functions as a router in operation 505 of FIG. 5 upon receiving the router conversion message. According to the router conversion processes of the end device, the parent device performs router conversion (i.e., network extension) only after completion of end device subscription of all network devices, which may efficiently support network scalability as a network depth increases by selecting child routers based on RSS, and may minimize depletion probability of addresses for child routers by converting an end device to a router by only using a general address for child routers without using one of $\delta_R$ special addresses for child routers.

Operation process of a subscription requesting device for network subscription as a child router and re-subscription will now be described considering addresses for child routers, which are divided into the two address spaces (i.e., operation 310), with reference to FIG. 6. When a device operating as a router in operation 601 of FIG. 6 is disconnected from its parent device in operation 602 of FIG. 6, the device updates information on adjacent routers by receiving a beacon message from routers nearby and determines a parent candidate group comprising routers having $S_R \leq 1$ from among adjacent routers (i.e., routers having available special addresses for child routers) in operation 603 of FIG. 6, and selects a parent device from the parent candidate group in a descending order of the remaining addresses for child routers and requests the parent device for network subscription in operation 604 of FIG. 6. When it is determined that the subscription is succeeded in operation 605 of FIG. 6, the device performs router operation in operation 601, and when it is determined that the subscription failed, the device removes the parent device from the parent candidate group, and when it is determined that the parent candidate group is still left in operation 606 of FIG. 6, the device repeats operation 604 for network subscription using special address for child routers until the parent candidate group is empty. When it is determined that the parent candidate group is empty in operation 606, the device finally determines that network connection as a router is failed, and performs end device network subscription processes (i.e., initial network subscription process) as shown in FIG. 3 in operation 607 of FIG. 6.

Operation processes of a parent device during network subscription as a child router and re-subscription of a subscription requesting device considering addresses for child routers, which are divided into the two address spaces, will now be described with reference to FIG. 7. When the parent device receives a router re-subscription request message from a subscription requesting device in operation 701 of FIG. 7 and it is determined that $S_R=2$ in operation 702 of FIG. 7 (i.e., when an address is available among $(N_R-\delta_R)$ general addresses for child routers), the parent device allocates a general address for child routers to the subscription requesting device in operation 704 of FIG. 7 and accepts network subscription in operation 706 of FIG. 7 (i.e., transmits a subscription acceptance message). However, when it is determined that $S_R \leq 1$ in operation 702 (i.e., when no address is available among $(N_R-\delta_R)$ general addresses for child routers) and it is determined that $S_R=1$ in operation 703 of FIG. 7 (i.e., when an address is available among $\delta_R$ special addresses for child routers), the parent device allocates a special address for child routers to the subscription requesting device in operation 705 of FIG. 7, and accepts network subscription in operation 706 (i.e., transmits a subscription acceptance message). However, when it is determined that $S_{ED}=0$ in operation 703 (i.e., when $N_R$ router addresses are all used up), the parent device rejects network subscription of the subscription requesting device in operation 707 of FIG. 7 (i.e., a subscription denial message is transmitted). The present invention is about a distributed operation method wherein each router directly determines whether to accept subscription of a subscription requesting device by using an independent address space owned by each router and directly allocates an address, and thus a message exchange overhead is low. Also, according to the present invention, a success probability of subscription and re-subscription as a router may be improved by using the special addresses for child routers unused in the router conversion process considering the two address spaces for child routers.

The present invention relates to a method for network subscription of a network device as a router or an end device in a tree structured wireless network (WN) comprising routers and end devices. According to the present invention, each router gets addresses from its parent router, which can be allocated its child routers and end devices, and divides the addresses into two spaces; a general address space and a special address space. According to the present invention, a subscription requesting device can subscribe to a network by using a special address for end devices only when the device cannot make network subscription by using a general address for end devices, thereby reducing the probability of depletion of addresses to be used for new network subscription and making ease of network subscription as an end device. Also, according to the present invention, if a router determines that network subscription of devices as an end device has been completed, the router selects as many child end devices experiencing low received signal strength (RSS) (i.e., easy for networking faraway) as the number of general addresses available for child routers and then converts the child end devices to child routers, thereby providing network scalability according to increase in a network depth and minimizing the use of special addresses for child router. Furthermore, when a subscription requesting device as an end device fails to subscribe to the network or a device subscribed to a network as a router tries to re-subscribe to the network, the device can subscribe to the network by using a special address for child routers, thereby making ease of network re-subscription as a router. Compared to conventional technique, the present invention can significantly increase a success rate of network subscription to a large-scale WN through the address allocation in the two steps and the selection of child routers.

A method of building a network (a method of subscribing to a network in a wireless network), according to an embodiment of the present invention, will now be described.

A method of building, in a distributed manner, a wireless network (WN) having a tree structure, which includes a router that is a network device capable of accepting child devices and an end device that is a network device not capable of accepting a child device, wherein the network device requests a router for network subscription as a child device by receiving a beacon signal including synchronization and network information from neighboring routers, and the router allocates the network device an address in an available address space allocated to itself and allows the network device to subscribe to a network, the method may include: (A) by a router, dividing an address space allocated for child device subscription into a address space for child router subscription and a address space for child end device subscription, and dividing each of the address space for child routers and the address space for child end devices into a general address space and special address space; (B) by the router, allowing a device requesting network subscription as an end device for the first time or requesting network re-subscription due to disconnection after network subscription as an end device to subscribe to a network by using a general address space and special address space for child end devices, which are allocated to the router; (C) by the router, allowing a device requesting network subscription as a child router for the first time or requesting network re-subscription due to disconnection after network subscription as a router to subscribe to a network by using a general address space and a special address space for child routers, which are allocated to the router; and (D) by the router, converting some of its child end devices to its child routers to provide network scalability.

(A) may include: (A-1) by the router, dividing the address space allocated for subscription of child devices subscription by a parent router into an address space for child router subscription and an address space for end device subscription; (A-2) by the router, dividing the address space for the child router subscription into a child router general address space for general child router subscription and a child router special address space for special child router subscription according to an address space ratio determined according to network application environments; (A-3) by the router, dividing the address space for the end device subscription into a child end device general address space for general end device subscription and a child end device special address space for special child end device subscription according to an address space ratio determined according to network application environments; and (A-4) by the router, transmitting a beacon message by inserting information about a status of an available address space of the router into the beacon message.

(A-4) may include: by the router, defining information $S_{ED}$ on an address space available for child end device subscription by a status when neither a general address nor a special address for child end device subscription is available, a status when only a special address for child end device subscription is available, and a status when a general address and a special address for child end device subscription are both available; by the router, defining information $S_R$ on an address space available for child router subscription by a status when neither a general address nor a special address for child router subscription is available, a status when only a special address for child router subscription is available, and a status when a general address and a special address for child router subscription are both available; and by the router, transmitting a beacon message including the information $S_{ED}$ and $S_R$.

(B) may include: (B-1) by a network device initiating network subscription for the first time, selecting a parent router candidate for network subscription; (B-2) by the parent router candidate, processing network subscription of the network device as a child end device by using the general address space for child end devices, which is available to the parent router candidate; (B-3) by a network device that fails network subscription as an end device by using a general address for child end devices or tries network re-subscription due to network disconnection by temporary communication failure after network subscription as an end device, selecting a parent router candidate for network subscription by using a special address for child end devices; and (B-4) by the parent router, processing network subscription of the network device as a child end device by using a general address or a special address for child end devices, which is available to the parent router.

(B-1) may include: by a network device initiating network subscription, receiving a beacon signal from adjacent routers by employing a conventional network search method; by the network device, determining, among the adjacent routers that transmitted the beacon signal, routers of which a reception signal strength is equal to or higher than a threshold value bis and of which a general address and a special address for child end devices are both available, as a parent router candidate group; and by the network device, selecting one of routers in the parent router candidate group as a parent router, wherein the threshold value $\delta_{RSS}$ is a minimum reception signal strength for guaranteeing reliable communication.

(B-2) may include: by the network device, requesting the parent router for network subscription using a general address for child end devices; by the parent router, when the parent router has a general address for child end devices, accepting network subscription of the network device by allocating a general address for child end devices to the network device, and when it does not have any general address for child end devices, denying network subscription of the network device; by the network device, when the parent router allocates a general address for child end devices, performing an end device function by using the allocated general address for child end devices, and when the network subscription is denied, removing the parent router from the parent router candidate group and initiating network subscription again as a child end device by selecting one of the remaining parent router candidates as a parent router; and by the network device, when the network subscription is denied by all parent router candidates, determining that the network subscription using a general address for child end devices is failed.

(B-3) may include: by a network device initiating network re-subscription as an end device after the network device determines that network subscription as an end device by using a general address for child end devices is failed or the network device after network subscription as an end device is disconnected from the network due to a communication failure, receiving a beacon signal transmitted from adjacent routers by using a conventional network search method; by the network device, determining a parent router candidate group, among adjacent routers that transmitted the beacon signal, comprising routers of which a reception signal strength of the beacon signal is equal to or higher than a threshold value $\delta_{RSS}$ and of which a special address for child end devices is available; by the network device, selecting a router in the parent router candidate group, that has the best address status available for subscription of child end devices, as a parent router.

(B-4) may include: by the network device, requesting the parent router for network subscription by using a special address for child end devices; by the parent router, when the parent router has both a general address and a special address for subscription of a child end device, accepting network subscription of the network device as an end device by allocating a general address for child end devices to the network device, when the parent router has only a special address for subscription of a child end device, accepting network subscription of the network device as an end device by allocating a special address for child end devices to the network device, and when the parent router has neither a general address nor a special address for subscription of a child end device, denying network subscription of the network device; by the network device, after the network receives a general address or a special address for child end devices from the parent router, performing an end device function by using the received address, and when network subscription is denied, removing the parent router from the parent router candidate group and initiating network subscription again by selecting a router in the parent router candidate group, that has the best address status available for subscription of child end devices, as a parent router; and by the network device, when all parent router candidates deny the network subscription, determining that the network subscription as an end device is failed.

(C) may include: (C-1) by a network device that fails network subscription as an end device or initiates network re-subscription due to network disconnection by a communication failure after network subscription as a router, selecting a parent router for network subscription as a router; and (C-2) by the parent router, processing network subscription of the network device as a child router by using an address space available for subscription of a child router.

(C-1) may include: by a network device that fails network subscription as an end device or initiates network re-subscription due to network disconnection by a communication failure after network subscription as a router, receiving a beacon signal transmitted from adjacent routers by using a conventional network search method; by the network device, determining a parent router candidate group comprising routers of which a strength of the received beacon signal is equal to or higher than a threshold value $\delta_{RSS}$ and of which a special address space for child routers is available, among the adjacent routers that transmitted the beacon signal; and by the network device, selecting a router in the parent router candidate group, which has the best address status available for subscription of child routers, as a parent router.

(C-2) may include: by the network device, requesting the parent router for network subscription by using an address for child routers; by the parent router, when the parent router has both a general address and a special address available for subscription of child routers, accepting network subscription of the network device as a child router by allocating the network device a general address available for network subscription of child routers, when the parent router has only a special address available for subscription of child routers, accepting network subscription of the network device as a child router by allocating the network device a special address available for network subscription of child routers, and when a the parent router has neither a general address nor a special address available for subscription of child routers, denying network subscription of the network device as a child router; by the network device, after receiving an address from the parent router, performing an end device function by using the received address, and when the network subscription is denied, removing the parent router from the parent router candidate group, and initiating the network subscription again as a child router by selecting a router in the parent router candidate group, which has the best address condition for subscription of child routers, as a parent router; and by the network device, when all parent router candidates deny the network subscription, determining that the network subscription is failed and performing (B) again.

(D) may include: (D-1) by a router, when the parent router has no general address available for subscription of child end devices or has no new request for network subscription from a network device for a certain period of time, selecting as many child end devices as general addresses available for subscription of child routers, and converting them to child routers; and (D-2) by an end device, after receiving a router conversion message from the parent router, replacing the address with a general address for child routers, which is included in the router conversion message, and performing a router function.

(D-1) may include: by the parent router, when the parent router has no general address available for subscription of child end devices or has no new request for network subscription from a network device for a certain period of time, selecting as many child end devices as general addresses available for subscription of child routers, and converting them to child routers for network scalability in an ascending order of reception signal strength or a descending order of distance from the parent router; by the parent router, allocating the selected child end device a general address for child routers in lieu of the address allocated previously; and by the parent router, transmitting the selected child end devices a router conversion message including information on the allocated address for child routers.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of constructing, in a distributed manner, a tree-structured wireless network (WN) comprising routers and end devices, where a router is a network device that can have child devices and an end devices is a network device that cannot have any child device, wherein a network device requests a router for network subscription as a child device after receiving a beacon signal transmitted from neighboring routers, which contains network synchronization and networking information, and the router accepts network subscription of the network device by allocating the network device an address in an address space allocated to the router for subscription of child devices, the method comprising:

(A) by a router, dividing an address space allocated to the router for subscription of child devices into an address space for subscription of child routers and an address space for subscription of child end devices, and respectively dividing each address space for subscription of child routers and child end device into a general address space and a special address space;

(B) determining, by the router, a general address or a special address for child end devices, which is allocated to the router for subscription of the child end devices based on a request for network subscription, and in response to determining a general address or a special address for the child end devices by the router, accepting a network subscription of a network device, based on whether the network device requests network subscription as a child end device for the first time or a network re-subscription as a child end device due to network disconnection after network subscription;

(C) determining, by the router, a general address and a special address for child routers, which is allocated to the router for subscription of a child router based on a request for network subscription, and in response to determining a general address and a special address for the child end router, by the router, accepting a network subscription of a network device, based on whether the network device requests network subscription as a child router for the first time or network re-subscription as a child router due to network disconnection after network subscription; and (D) by the router, converting some of child end devices of the router to child routers of the router for provision of network scalability.

2. The method of claim 1, wherein step (A) comprises:

(A-1) by the router, dividing the address space for subscription of child devices, which is allocated by a parent router of the router, into an address space for subscription of child routers and an address space for subscription of child end devices;

(A-2) by the router, dividing the address space for the subscription of child routers into a general address space for child routers for general subscription of a child router and a special address space for child routers for special subscription of a child router according to a ratio of the general address space and the special address space for child routers, which is determined in consideration of network application environments;

(A-3) by the router, dividing the address space for the subscription of child end devices into a general address space for child end devices for general subscription of a child end device and a special address space for child end devices for special subscription of a child end device according to a ratio of the general address space and the special address space for child end devices, which is determined in consideration of network application environments; and (A-4) by the router, broadcasting a beacon message including information on the address space of the router available for subscription of child devices.

3. The method of claim 2, wherein step (A-4) comprises: by the router, defining $S_{ED}$, which is an information on condition of an address space available for subscription of child end devices, by a state when the router has no general and special address available for subscription of child end devices, a state when the router has only special addresses available for subscription of child end devices, and a state when the router has both general and special addresses available for subscription of child end devices;

by the router, defining $S_R$, which is an information on condition of an address space available for subscription of child routers, by a state when the router has no general address and special address available for subscription of child routers, a state when the router has only special addresses available for subscription of child routers, and a state when the router has both general addresses and special addresses available for subscription of child routers; and by the router, broadcasting a beacon message including the information $S_{ED}$ and $S_R$.

4. The method of claim 1, wherein step (B) comprises:

(B-1) by a network device that initiates network subscription for the first time, selecting a parent router candidate for network subscription;

(B-2) by the parent router candidate, accepting network subscription of the network device as a child end device by using a general address for child end devices, which is available to the parent router candidate;

(B-3) by a network device that fails network subscription as an end device by using a general address for child end devices or re-subscribes to a network due to network disconnection by a communication failure after network subscription as an end device, selecting a parent router for network subscription by using a special address for child end devices; and (B-4) by the parent router, accepting network subscription of the network device as a child end device by using a general address or a special address for child end devices, which is available to the parent router.

5. The method of claim 4, wherein step (B-1) comprises:

by a network device that initiates network subscription, receiving a beacon signal transmitted from adjacent routers by using a network search method;

by the network device, determining a parent router candidate group comprising routers of which received signal strength is equal to or higher than a threshold value $\delta_{RSS}$ and of which general addresses and special addresses for child end devices are both available, among the adjacent routers that transmitted the beacon signal; and by the network device, selecting a router in the parent router candidate group as a parent router, wherein the threshold value $\delta_{RSS}$ is a minimum received signal strength for guaranteeing reliable communication.

6. The method of claim 4, wherein step (B-2) comprises:

by the network device, requesting the parent router for network subscription using a general address for child end devices;

by the parent router, when the parent router has a general address for child end devices available for subscription of a child end device, accepting network subscription of the network device by allocating the network device general addresses for child end devices, which is available to the parent router for subscription of a child end device, and when the parent router has no general address for child end devices, which is available to the parent router for subscription of a child end device, denying network subscription of the network device;

by the network device, after receiving a general address for child end devices from the parent router, performing an end device function by using the received address, and when the network subscription is denied, removing the parent router from the parent router candidate group and initiating network subscription again as a child end device by selecting a router in the parent router candidate group as a parent router; and by the network device, when the network subscription is denied by all parent router candidates, determining that the network subscription using a general address for child end devices is failed.

7. The method of claim 4, wherein step (B-3) comprises:

by a network device that fails network subscription as an end device by using a general address for child end devices or re-subscribes to a network due to network disconnection caused by a communication failure after network subscription as an end device, receiving a beacon signal transmitted from adjacent routers by using a network search method;

by the network device, determining a parent router candidate group comprising routers of which received signal strength is equal to or higher than a threshold value $\delta_{RSS}$ and of which a special address for child end devices is available, among the adjacent routers that transmitted the beacon signal; and by the network device, selecting a router in the parent router candidate group, which has the greatest number of address space conditions available for subscription of a child end device, as a parent router.

8. The method of claim 4, wherein step (B-4) comprises:
by the network device, requesting the parent router for network subscription by using a special address for child end devices;
by the parent router, when the parent router has both general addresses and special addresses for child end devices available for subscription of a child end device, accepting network subscription of the network device as an end device by allocating the network device a general address for child end devices available for subscription of a child end device, when the parent router only has special addresses for child end devices available for subscription of a child end device, accepting network subscription of the network device by allocating the network device a special address for child end devices available for subscription of a child end device, and when the parent router has no general and special address for child end devices available for subscription of a child end device, denying network subscription of the network device;
by the network device, after receiving a general address or a special address for child end devices from the parent router, performing an end device function by using the received address, and when the network subscription is denied, removing the parent router from the parent router candidate group and initiating the network subscription again by selecting a router in the parent router candidate group, which has the greatest number of address space conditions available for subscription of a child end device, as a parent router; and
by the network device, when all parent router candidates deny the network subscription, determining that the network subscription as an end device is failed.

9. The method of claim 1, wherein step (C) comprises:
(C-1) by a network device that fails network subscription as an end device or re-subscribes to a network due to network disconnection caused by a communication failure after network subscription as a router, selecting a parent router for network subscription as a child router; and
(C-2) by the parent router, accepting network subscription of the network device as a child router by using an address for child routers, which is available to the parent router.

10. The method of claim 9, wherein step (C-1) comprises:
by a network device that fails network subscription as an end device by using a general address for child end devices or re-subscribes to a network due to network disconnection caused by a communication failure after network subscription as a router, receiving a beacon signal transmitted from adjacent routers by using a network search method;
by the network device, determining a parent router candidate group comprising routers of which received signal strength is equal to or higher than a threshold value $\delta_{RSS}$ and of which a special address for child routers is available, among the adjacent routers that transmitted the beacon signal; and
by the network device, selecting a router in the parent route candidate group, which has the greatest number of address space conditions available for subscription of a child router, as a parent router.

11. The method of claim 9, wherein step (C-2) comprises:
by the network device, requesting the parent router for network subscription by using an address for child routers;
by the parent router, when the parent router has both general addresses and special addresses for child routers available for subscription of a child router, accepting network subscription of the network device as a child router by allocating the network device a general address for child routers available for subscription of a child router, when the parent router only has special addresses for child routers available for subscription of a child router, accepting network subscription of the network device by allocating the network device a special address for child routers available for subscription of a child router, and when the parent router has no general and special address for child routers available for subscription of a child router, denying network subscription of the network device;
by the network device, after receiving an address for child routers from the parent router, performing a router function by using the received address, and when the network subscription is denied, removing the parent router from the parent router candidate group and initiating the network subscription as a child router again by selecting a router in the parent router candidate group, which has the greatest number of address space conditions available for subscription of a child router, as a parent router; and
by the network device, when all parent router candidates deny the network subscription, determining that the network subscription is failed and performing (B).

12. The method of claim 1, wherein step (D) comprises:
(D-1) by a router, when the parent router has no general address for child end devices available for subscription of a child end device or has no new request for network subscription from a network device for a certain period of time, selecting as many child end devices as general addresses available for subscription of a child router, and converting them to child routers of the router; and
(D-2) by an end device, after receiving a router conversion message transmitted from the parent router of the end device, replacing the address of the end device with a general address for child routers, which is included in the router conversion message, and performing a router function.

13. The method of claim 12, wherein step (D-1) comprises:
by the parent router, when the parent router has no general address for child end devices available for subscription of a child end device or has no new request for network subscription from a network device for a certain period of time, selecting as many child end devices as general addresses available for subscription of a child router, in an ascending order of reception signal strength or a descending order of distance from the parent router for network scalability;
by the parent router, allocating the selected child end device a general address for child routers for replacement of the address allocated previously; and
by the parent router, transmitting the selected child end devices a router conversion message including information on the allocated address for child routers.

* * * * *